United States Patent [19]
Otome et al.

[11] Patent Number: 5,671,703
[45] Date of Patent: Sep. 30, 1997

[54] TWO-CYCLE ENGINE

[75] Inventors: Kimitake Otome; Osamu Tamura, both of Iwata, Japan

[73] Assignee: Yamaha Matsudoki Kabushiki Kaisha, Iwata, Japan

[21] Appl. No.: 715,456

[22] Filed: Sep. 18, 1996

[30] Foreign Application Priority Data

Sep. 18, 1995 [JP] Japan ................................ 7-238427

[51] Int. Cl.⁶ .................................................. F02B 75/40
[52] U.S. Cl. ........................................ 123/65 P; 123/65 W
[58] Field of Search ............................. 123/65 P, 65 W, 123/65 PD, 73 PP

[56] References Cited

U.S. PATENT DOCUMENTS

| | | | |
|---|---|---|---|
| 4,638,770 | 1/1987 | Fox | 123/65 WDW |
| 4,821,687 | 4/1989 | Iwai | 123/65 W |
| 5,007,384 | 4/1991 | Blair | 123/70 R |
| 5,040,496 | 8/1991 | Plohberger et al. | 123/65 W |
| 5,065,711 | 11/1991 | Lesley | 123/188.4 |
| 5,065,712 | 11/1991 | Hundleby | 123/188.14 |
| 5,205,245 | 4/1993 | Flack et al. | 123/65 P |
| 5,213,069 | 5/1993 | Curtil | 123/65 W |
| 5,251,580 | 10/1993 | Torigai | 123/65 P |
| 5,311,848 | 5/1994 | Isaka et al. | 123/184.56 |
| 5,490,483 | 2/1996 | Tanikake et al. | 123/65 P |

*Primary Examiner*—David A. Okonsky
*Attorney, Agent, or Firm*—Knobbe, Martens, Olson & Bear LLP

[57] ABSTRACT

A number of embodiments of two-cycle engines employing Schnurle-type scavenging. In addition, a tumble port is also incorporated so as to introduce a tumble charge into the combustion chamber and reduce the likelihood of fresh charge from exiting from the exhaust port. This tumble charge may be utilized to achieve stratification, and the fuel charge may be delivered to the combustion chamber through the tumble port or in proximity to it. Also, arrangements are shown for controlling the amount of tumble flow.

15 Claims, 10 Drawing Sheets

TWO-CYCLE ENGINE

BACKGROUND OF THE INVENTION

This invention relates to a two-cycle engine and more particularly to an improved scavenging system for such engines.

The advantages of two-cycle engines are well known. The primary advantages of a two-cycle engine relative to a four-cycle engine are its simplicity and its potentially higher specific output. Because these engines are primarily ported and because they fire every revolution rather than every other revolution, these results are obtained. However, the necessity for ensuring complete combustion and total scavenging of the engine presents significant problems. In addition, there is always the risk that some of the fresh fuel-air charge will pass out of the exhaust port at the end of the scavenging cycle. Thus, emission control is a problem that is greater with a two-cycle engine generally than with a four-cycle engine.

One highly successful type of scavenging system employed with two-cycle engines is the so-called Schnurle-type scavenging. With this type of scavenging there is provided a pair of main scavenging ports that are positioned on opposite sides of the exhaust port. The scavenging air flow enters the combustion chamber from the scavenging ports and flows generally axially across the cylinder bore and upwardly toward the cylinder head. The charge then crosses the combustion chamber and flows downwardly toward the exhaust port. This type of scavenging is quite effective in that it takes a relatively long time for the fresh air charge to reach the exhaust port, however, there is still a risk that the fresh fuel air charge may exit through the exhaust port.

It is, therefore, a principal object of this invention to provide an improved scavenging system for a two-cycle engine that insures against blow out of the fresh fuel charge.

Under some running conditions it is also desirable to obtain a high degree of turbulence in the combustion chamber. This is particularly true when operating at low speeds and low loads. It has been found that turbulence can improve the flame propagation and ensure complete combustion under these difficult running conditions.

It is a further object of this invention to provide an improved scavenging system for a two-cycle engine which will not only effectively scavenge the combustion chamber without having the fresh fuel charge pass out of the exhaust port, but which will also introduce adequate turbulence to ensure complete combustion under all running conditions.

It is a still further object of this invention to provide a Schnurle-type scavenging system for an engine wherein tumble is also generated in the intake charge so as to promote turbulence and rapid flame propagation under low speeds and low loads.

With Schnurle-type scavenging it is also somewhat difficult to achieve stratification in the combustion chamber. Stratification is, however desirable at lower loads and speeds to insure good fuel economy and exhaust emission control. Stratification permits a total cylinder charging that is less than stoichiometric. A stoichiometric charge can be maintained in proximity to the spark plug at the time of firing to insure ignition.

It is a still further object of this invention to provide a Schnurle-type scavenging system for an engine wherein stratification can be achieved.

SUMMARY OF THE INVENTION

This invention is adapted to be embodied in a two-cycle internal combustion engine having a cylinder block forming a cylinder bore in which a piston reciprocates and which is closed at its opposite end by a cylinder head. An exhaust port is formed in the cylinder bore at one side thereof. A scavenge port arrangement is provided in the cylinder bore in and is configured so as to provide a scavenging air flow that moves generally axially across the cylinder bore upwardly toward the cylinder head, back across the cylinder bore, and then axially down the cylinder bore from the cylinder head toward the exhaust port. Means are provided for introducing a cross flow action of scavenging air flow transverse to the aforenoted pattern.

DETAILED DESCRIPTION OF THE PREFERRED EMBODIMENTS OF THE INVENTION

Referring now in detail to the drawings, and initially to FIGS. 1–4, a two-cycle internal combustion engine constructed in accordance with a first embodiment of the invention is shown in these figures and is identified generally by the reference numeral 11. In the figures showing the engine 11, many of the components are shown in only schematic form. Where any component is so shown, this is because those components are primarily conventional and any prior art type of construction may be employed for them. As should be apparent from the foregoing description, the invention relates primarily to the scavenging system for the engine 11. Therefore, other components of the engine 11, which are not primarily related to the scavenging system, have been either shown schematically, only partially, or not at all. Where that is the case, those skilled in the art can readily resort to any known construction.

The invention also is depicted in conjunction with only a single cylinder of a multiple-cylinder internal combustion engine. Again, those skilled in the art will readily understand how the invention may be practiced with multiple-cylinder engines of any configuration.

Figure 1:
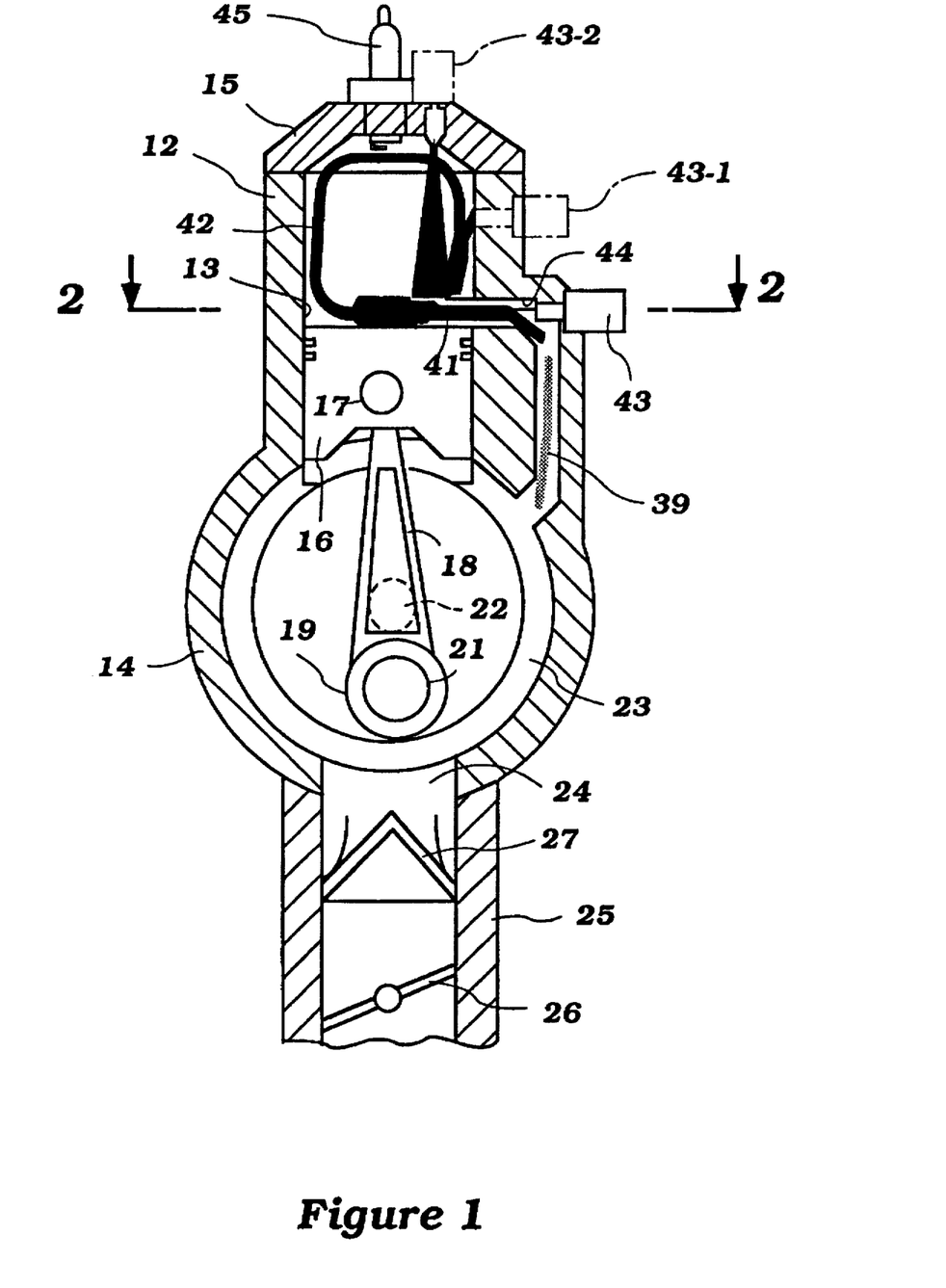
FIG. 1 is a cross-sectional view, taken primarily along the line 1—1 of FIG. 2, through a single cylinder of an internal combustion engine constructed and operated in accordance with an embodiment of the invention, with various fuel injector locations being shown both in solid and phantom lines.

The engine 11 is comprised of a cylinder block 12 that is formed with at least one cylinder bore 13. The lower end of the cylinder bore 13 is closed by the skirt of the cylinder block 12 and a crankcase member 14. The opposite end is closed by a cylinder head assembly 15 that is affixed to the cylinder block in any known manner. This may also include engines wherein the cylinder block 12 and the cylinder head 15 are integrally formed.

A piston 16 reciprocates in the cylinder bore 13 and is connected by means of a piston pin 17 to the small or upper end of a connecting rod 18. The lower or big end 19 of the connecting rod 18 is journaled on a throw 21 of a crankshaft 22. The crankshaft 22 is rotatably journaled in a crankcase chamber 23 that is formed by the cylinder block and crankcase member 14. If a multiple-cylinder engine is employed, the crankcase chamber 23 associated with each cylinder bore 13 is preferably sealed from the others.

An induction system supplies an air charge to the crankcase chamber 23 through an intake port 24 formed in the crankcase member 14. This induction system includes a throttle body 25 in which a flow-controlling throttle valve 26 is positioned. The throttle valve 26 is connected in an appropriate manner to a suitable throttle actuator.

A reed-type check valve assembly 27 is interposed between the throttle valve 26 and the intake port 24, and is preferably in close proximity to the intake port 24. The reed-type check valve 27 permits the air flow to enter the crankcase chamber 23 when the piston 16 is moving upwardly in the cylinder bore. However, as the piston 16 moves downwardly to compress the charge in the crankcase chamber 23, the check valve 27 will close so as to permit this compression to take place and to prevent reverse flow through the induction system.

Figure 2:
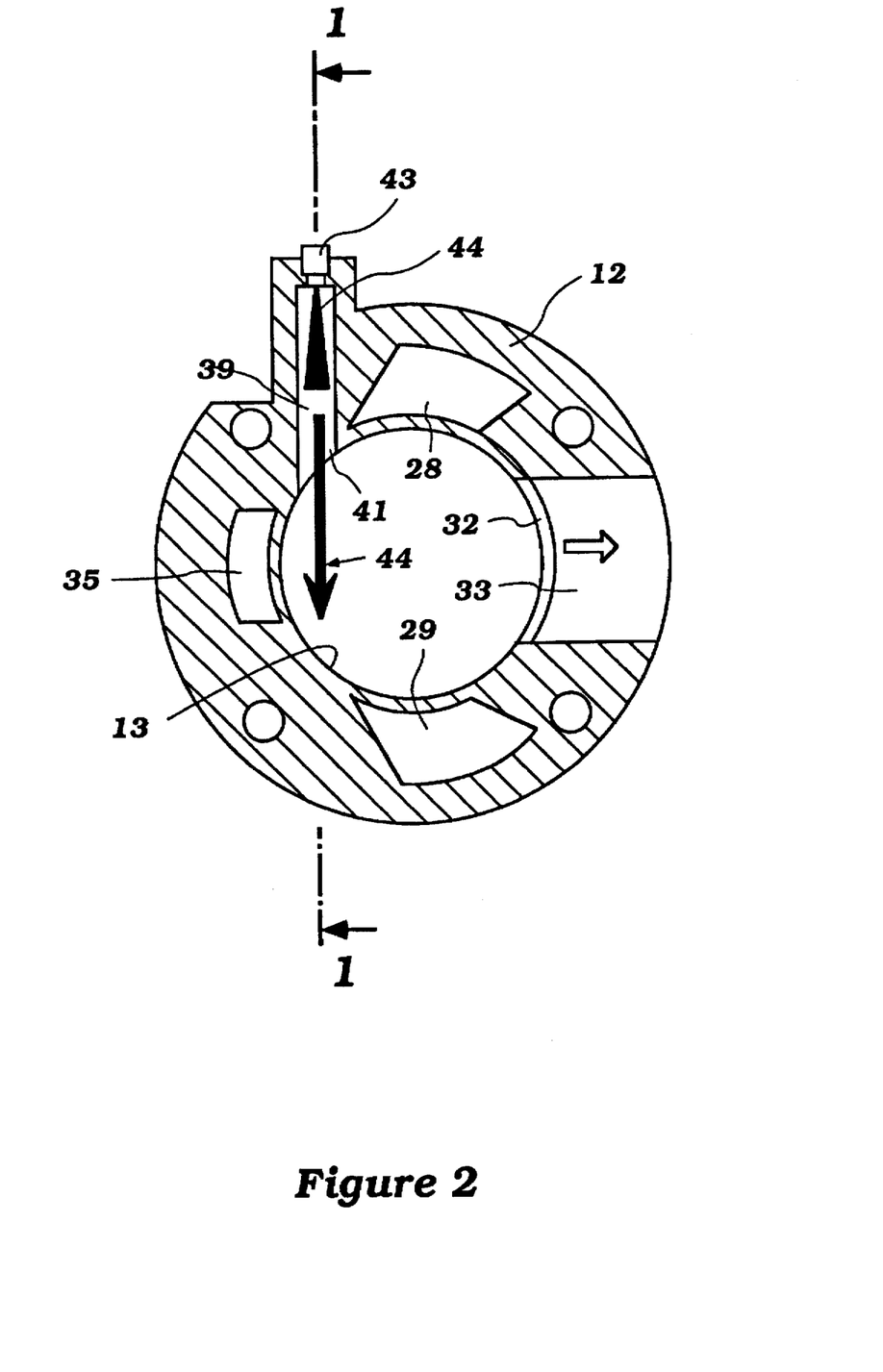
FIG. 2 is a transverse cross-sectional view taken along the line 2—2 of FIG. 1.
Figure 4:
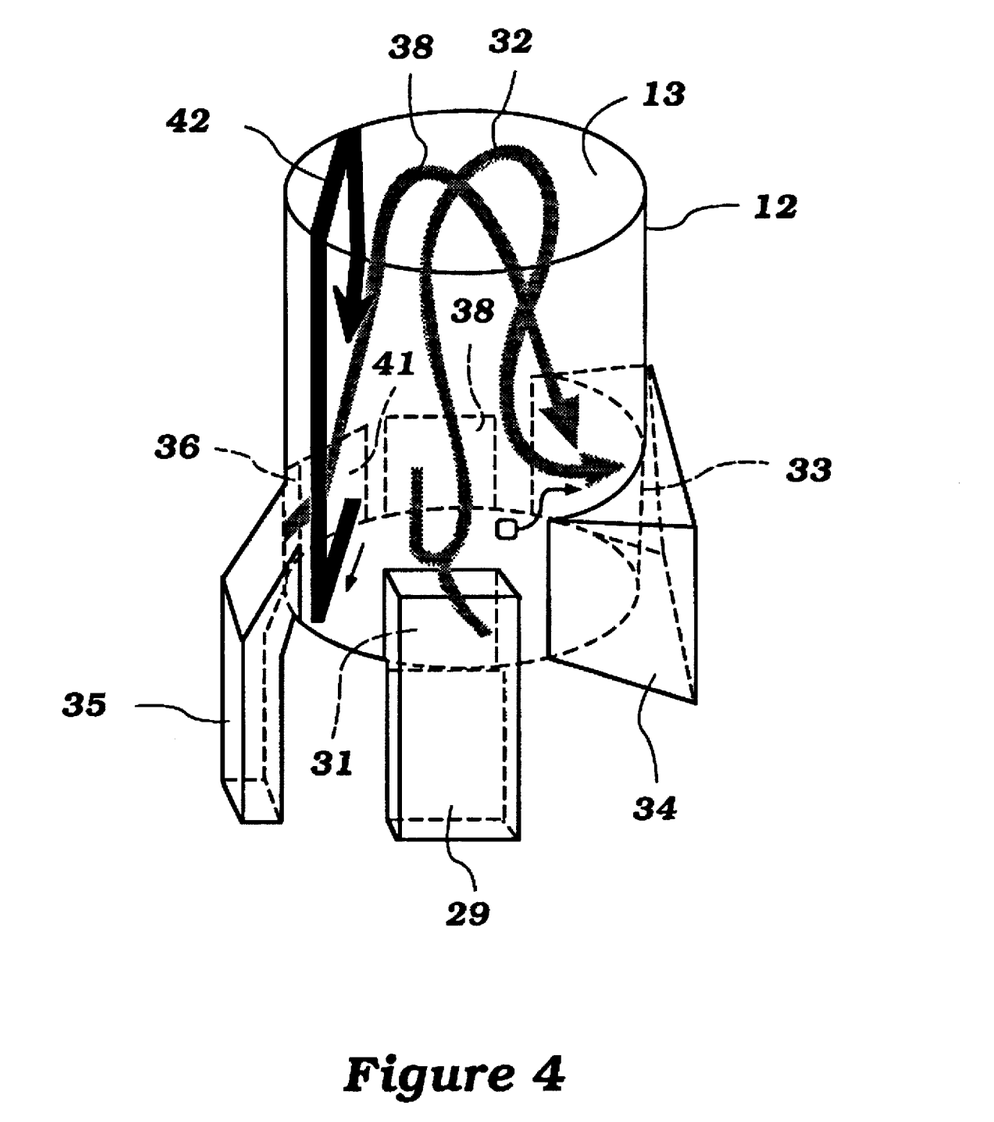
FIG. 4 is a perspective view showing the normal scavenge flow and the flow generated by the added tumble scavenge port.

A scavenging system, best shown in FIGS. 2 and 4, is provided for transferring the charge which has been compressed in the crankcase chamber 23 to the combustion chamber formed by the head of the piston 16, the cylinder bore 13, and the cylinder head 15. This charge is then further compressed in the combustion chamber as the piston 16 continues its upward stroke toward the cylinder head 15.

This scavenging system includes a pair of main scavenge passages 28 and 29 that are formed in the cylinder block 12 on opposite sides of an exhaust port, to be described later, and which extends from an inlet openings in the crankcase chamber 23 to scavenge ports 30 and 31 that open through the cylinder bore 13. These scavenge passages 28 and 29 and the scavenge ports 30 and 31 are configured so as to create a flow pattern in the combustion chamber, indicated by the shaded arrow 32 in FIG. 4. This flow moves generally axially toward the cylinder head 15 along the side of the cylinder bore 13, across the cylinder bore axis, and then downwardly toward an exhaust port 33 formed in the cylinder bore 13 between the main scavenge ports 30 and 31. This exhaust port 33 communicates with an exhaust passage 34 that extends through the cylinder block 12 and delivers the exhaust gases to the atmosphere through a suitable exhaust system, which is not shown.

In addition to the pair of main scavenge passages 28 and 29, there is provided a center scavenge passage 35. The scavenge passage 35 is positioned in diametrically opposed relationship to the exhaust port 33 and is configured so as to open into the crankcase chamber 23 at its inlet end. The passage 35 terminates in a center scavenge port 36 which is disposed between the main scavenge ports 30 and 31 and diametrically opposite to the exhaust port 33. This center scavenge passage 35, and its exit scavenge port 36 is configured so as to provide a flow pattern, as indicated by the shaded arrow 38 in FIG. 4, which also flows generally axially along the cylinder bore axis 13 upwardly toward the cylinder head 15. The flow then passes across the cylinder bore toward the side where the exhaust port 33 is formed and then downwardly so as to exit this port.

The construction of the engine 11 as thus far described may be considered to be conventional. In accordance with the invention, there is provided a tumble scavenge passage 39, which also extends from an inlet end in the crankcase chamber 23 along the axis of the cylinder bore 13 at one side thereof and which exits into the combustion chamber through a tumble port 41. This tumble port 41 and the tumble passage 39 are configured so as to create a flow pattern in the combustion chamber that travels first across the cylinder bore axis toward the opposite side of the cylinder bore, then axially upwardly along the side of the cylinder bore 13 toward the cylinder head 15. This charge then passes back across the cylinder bore and flows axially downwardly back toward the tumble port 41, as seen by the arrow 42 in FIG. 4. Hence, this tumble passage 39 and tumble port 41 create turbulence in the combustion chamber and a flow which is generally not directed toward the exhaust port 33.

This flow may also somewhat cause a skew to the flow action from the center scavenge passage 36 and the side scavenge passages 30 and 31 so as to further improve the tumbling action and the turbulence in the combustion chamber, particularly at low speeds.

In accordance with one embodiment of the invention, a fuel injector 43 is mounted in the side of the cylinder block 12 so as to have a spray pattern 44 that flows with the air flow through the tumble passage 39 and port 41 so as to improve fuel mixing in the combustion chamber. This fuel pattern is also shown in FIG. 1 by the same shaded line 42. The resulting flow pattern also stratifies the mixture in the combustion chamber to form a richer and stoichiometric charge in proximity to a spark plug 45 mounted in the cylinder head 15. Also since this flow is not directed toward the exhaust port 36, fuel is not likely to escape from the cylinder bore 13 before it has burned.

Alternatively, the fuel injector may be mounted at the location 43-1, which is axially above the tumble passage 41, and thus will still be intersected by the flow pattern 42 to promote homogenous mixing of the fuel charge and/or stratification under some running conditions in proximity to the spark plug 45 that is mounted in the cylinder head 15 and which is fired in a known manner. As a result, there will always be a stoichiometric mixture present at the gap of the spark plug 45 at the time of ignition, and thus lean-burn running can be accomplished under low-speed, low-load conditions.

Alternatively, the fuel injector may be mounted at the location 43-2 in the cylinder head 15 so as to spray downwardly into the cylinder bore 13. Again, however, the spray location is such that the fuel will be congregated at the gap of the spark plug 45 at the time of firing so as to provide stratification and operation which permits lean burn.

Figure 3:
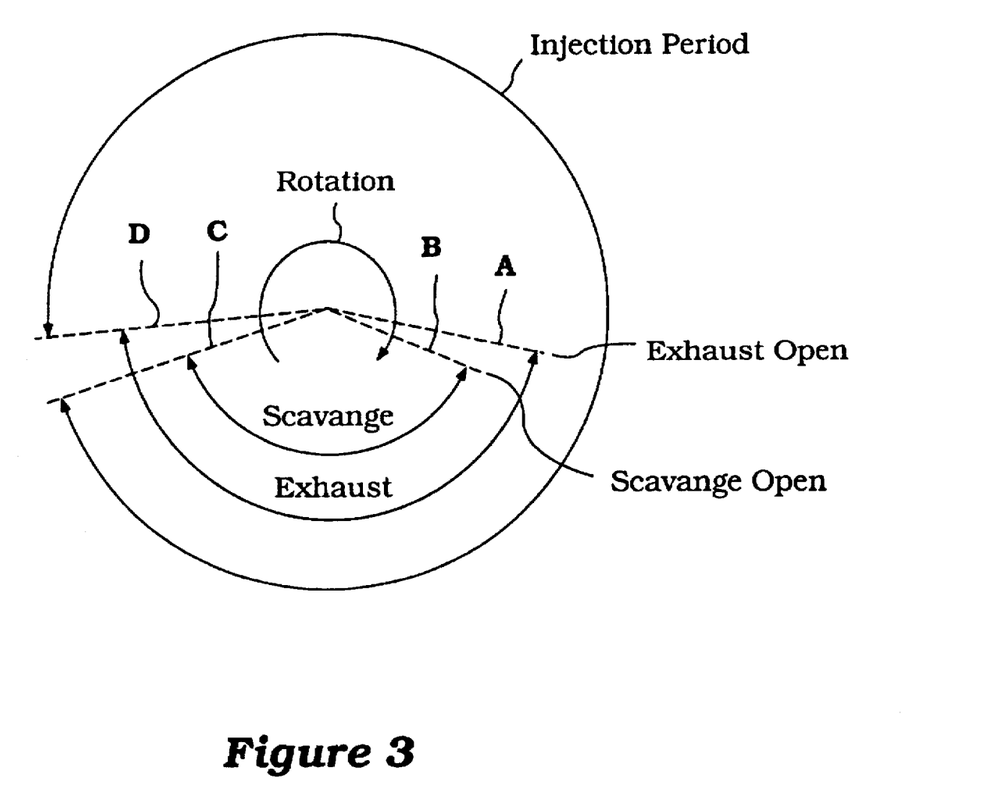
FIG. 3 is a timing diagram showing the events of the engine depicted in FIGS. 1 and 2.

FIG. 3 shows the timing events for this embodiment. The events are, however, basically the same for all embodiments. The exhaust port 32 is opened by the movement of the piston 16 at the crank angle A. The scavenge ports 30, 31, 36 and 41 all open at the crank angle B and then close at the angle C. At any time during this rotation, the fuel injection may occur.

The exhaust port 33 closes at the crank angle D and it is best to inject no fuel between the angles C and D to insure against the escape of fuel into the exhaust.

Figure 5:
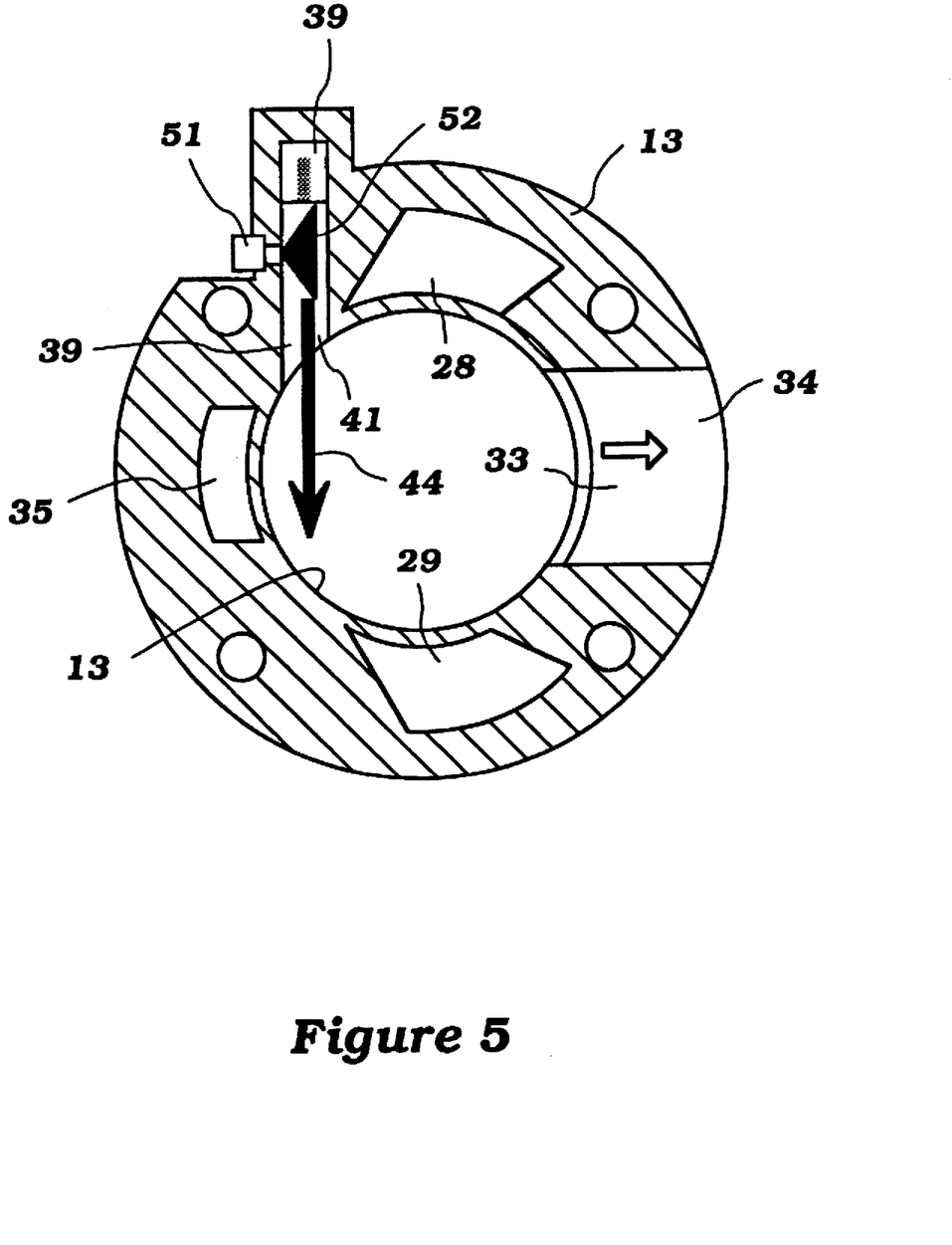
FIG. 5 is a cross-sectional view, in part similar to FIG. 2, and shows another embodiment of the invention.

FIG. 5 shows another embodiment of the invention which is the same as the first embodiment described in FIG. 1, except that in this embodiment the fuel injector 51 is positioned so that its spray pattern does not go in the same direction as the tumbling air flow 44, but rather sprays in a pattern 52 which is transverse to this air flow pattern. Hence, the spray 52 is confined primarily within the tumble passage 39 adjacent the tumble port 41. This will ensure more complete mixing of the fuel with the tumbling air flow, and thus can further improve stratification.

Figure 6:
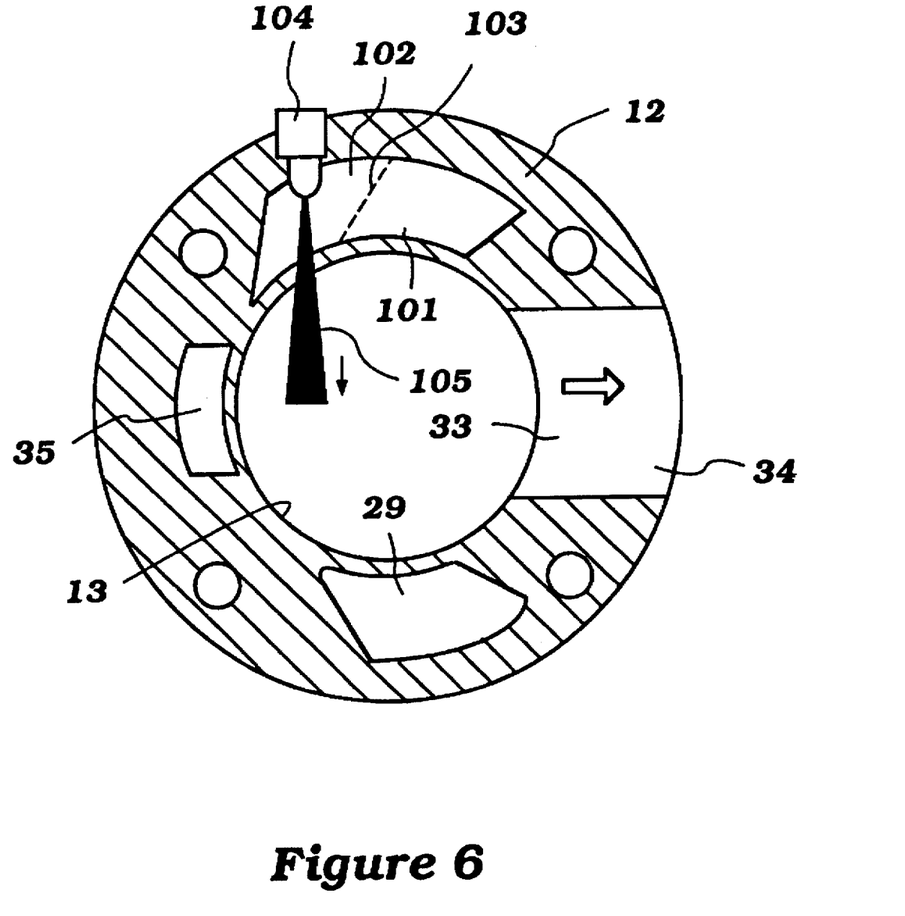
FIG. 6 is a cross-sectional view, in part similar to FIGS. 2 and 5, and shows a further embodiment of the invention.

FIG. 6 shows another embodiment of the invention. This embodiment differs from the previously described embodiments in that the tumble passage and port are actually formed as a part of one of the main scavenge passages, this being the passage 101 indicated in this figure. The remaining passages, which are the same as those previously described, have been identified by the same reference numerals, and hence these passages will not be described again.

However, it should be seen that the scavenge passage 101 has what constitutes an extension, as indicated by the area indicated by the reference numeral 102, which is defined toward the center scavenge passage 35 from an imaginary line 103, which would be the peripheral edge of a conventional Schnurle-type side scavenge passage. Hence, the area 102 actually functions as the tumble passage, and the tumble port also has this same circumferential extent so as to create the flow pattern 44.

In this embodiment a fuel injector 104 is provided so it sprays in a pattern 105, which is generally aligned with the portion of the tumbling air flow which enter the combustion chamber through the tumbling portion 102 of the passage 101. Hence, a stratification will also be achieved with this embodiment. This embodiment otherwise has the same advantages as have already been described, and thus further description of this embodiment is not believed to be necessary to permit those skilled in the art to practice the invention.

Figure 7:
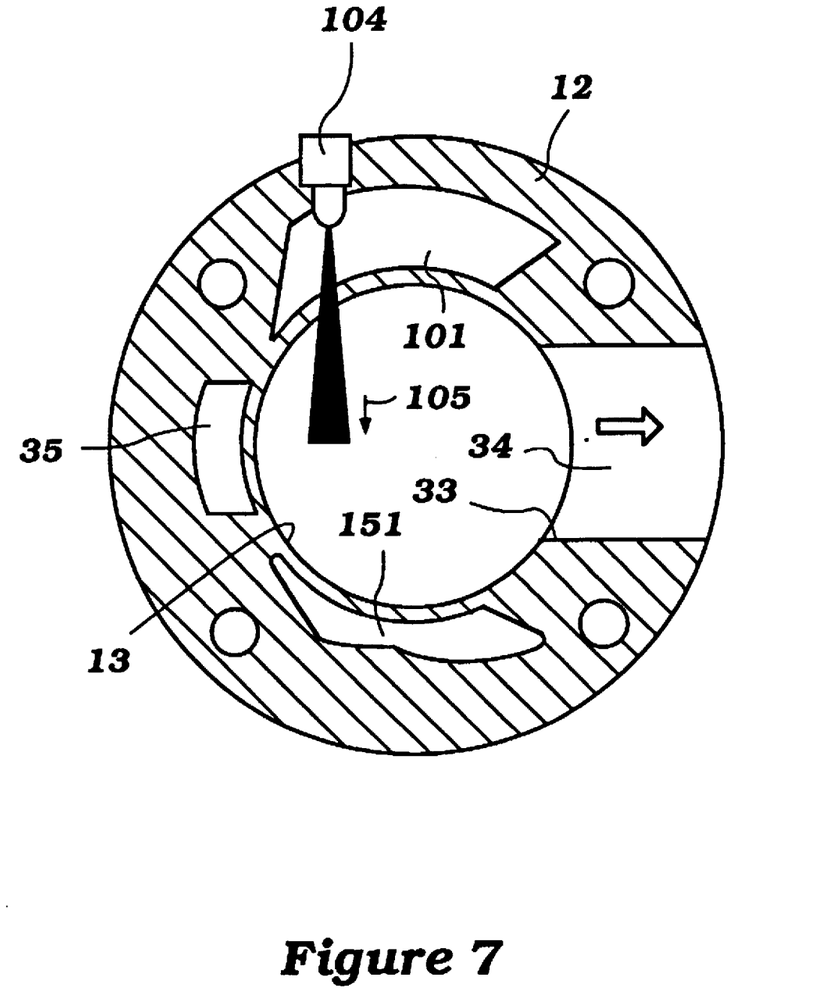
FIG. 7 is a cross-sectional view, in part similar to FIGS. 2, 5, and 6, and shows a still further embodiment of the invention.

FIG. 7 shows another embodiment which is like the embodiment of FIG. 6 in that the passage 101 serves the combined function of acting as a combined Schnurle-type scavenge passage as well as a tumble passage. In this embodiment, however, the opposite scavenge passage, indicated by the reference numeral 151, is configured so as to have a somewhat modified scavenging flow on the opposite side of the cylinder bore. The scavenge passage 151 has greater circumferential extent than the previous main scavenge passage 29, but has less width so as to provide substantially the same air flow volume.

Figure 8:
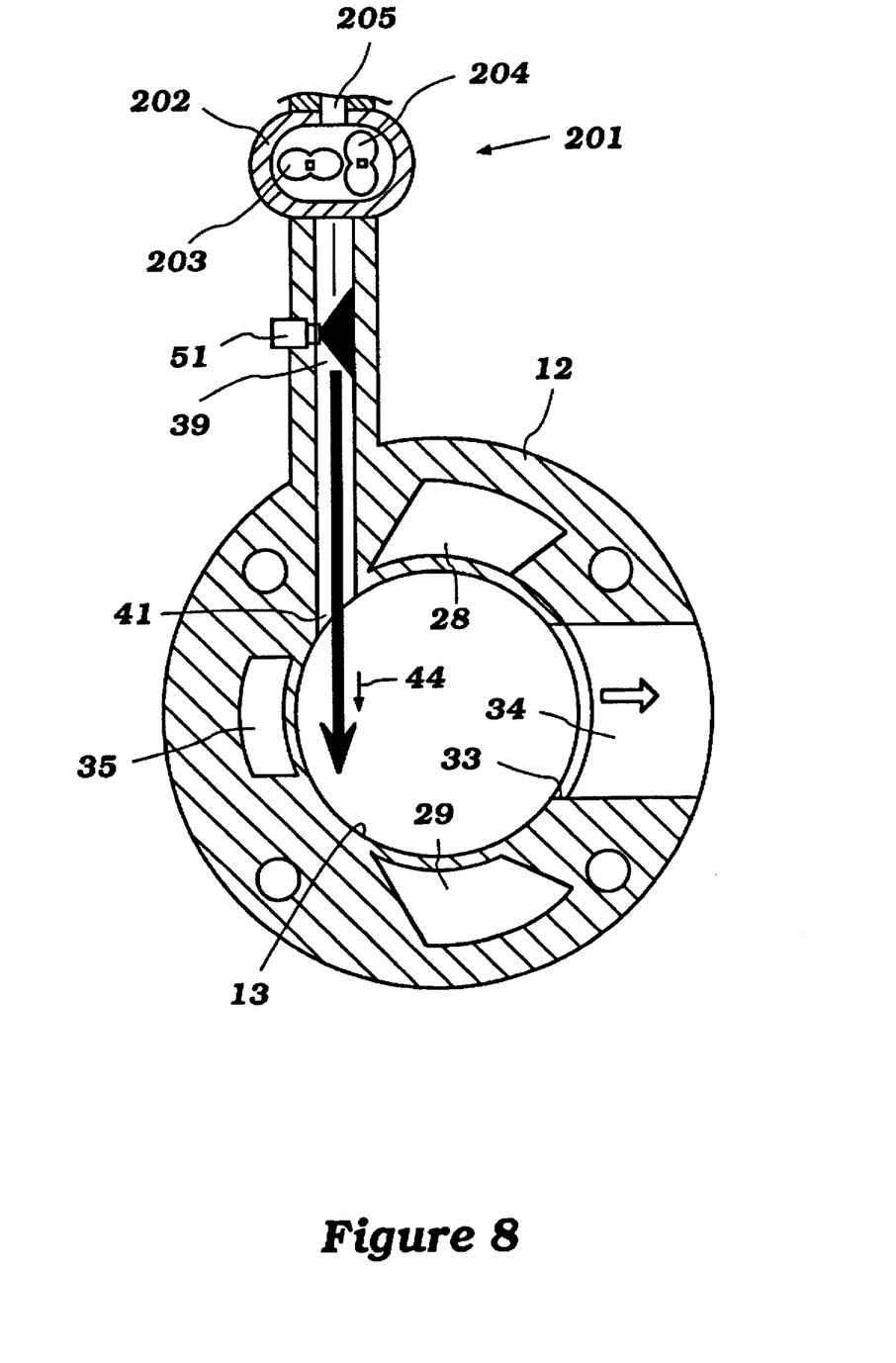
FIG. 8 is a cross-sectional view, in part similar to FIGS. 2 and 5–7, and shows yet another embodiment of the invention.

In all of the embodiments as thus far described, the engine has been described as being of the crankcase compression type. FIG. 8 shows another embodiment of the invention which functions both as a crankcase compression engine, but also as a supercharged engine. This embodiment employs a tumble passage of the type shown in FIG. 5, and therefore the components of this embodiment, which are the same as that embodiment, have been identified by the same reference numerals and will not be described again, except as to understand the construction and operation of this embodiment.

In this embodiment the tumble flow can be augmented by providing, rather than crankcase compression flow, flow from a supercharger, indicated generally by the reference numeral 201. The supercharger 201 has an outer casing 202 that contains a pair of intermeshing rotors 203 and 204, which are driven by the crankshaft 22 through a suitable gear train. Although a positive displacement, Roots-type supercharger is employed, it will be apparent to those skilled in the art that other types of compressors may be employed.

An atmospheric air inlet 205 admits air to the casing 202 for compression and delivery to the tumble passage 39. By controlling the speed or amount of boost by the supercharger 201, the degree of tumbling action can be controlled.

Figure 9:
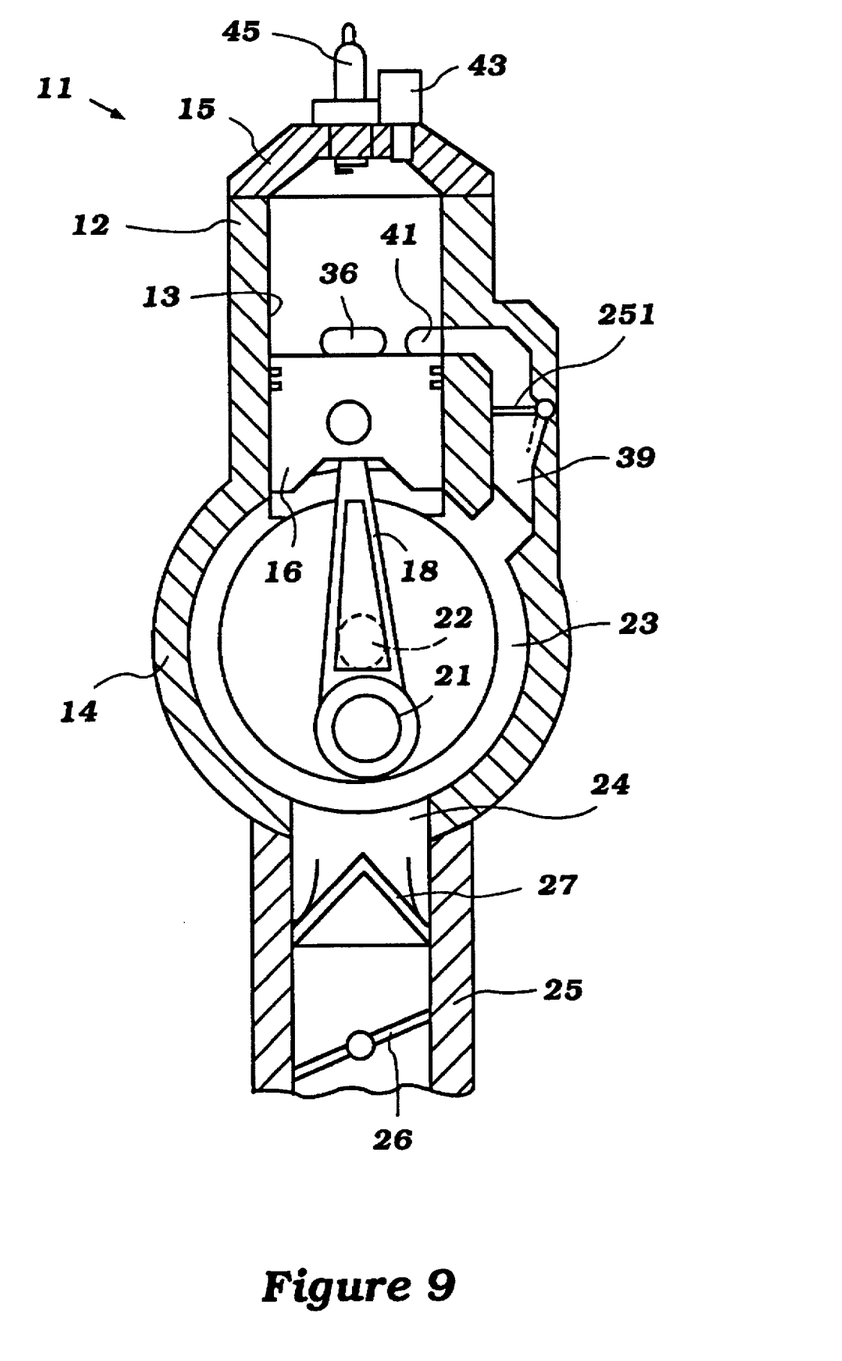
FIG. 9 is a cross-sectional view, in part similar to FIG. 1, and shows a further embodiment of the invention.

From the description of FIG. 8, it should be apparent that at times it may be desirable not to have the tumble action. As has been previously noted, the tumble action is particularly desirable in order to improve turbulence and in some instances achieve stratification under low-speed, low-load condition. FIG. 9 shows another embodiment of the invention which is basically the same as the embodiment of FIG. 1. In this embodiment, however, a tumble control valve 251 is positioned in the tumble passage 39 between its inlet end and the tumble port 41. By controlling the position of the tumble valve 251 from the open tumbling position, as shown in phantom lines, to the closed, non-tumbling position shown in solid lines, it is possible to selectively utilize the tumble action or disable it. Generally, the strategy would be such to introduce tumbling action under low-speed, low-load conditions and eliminate it under other running conditions.

Figure 10:
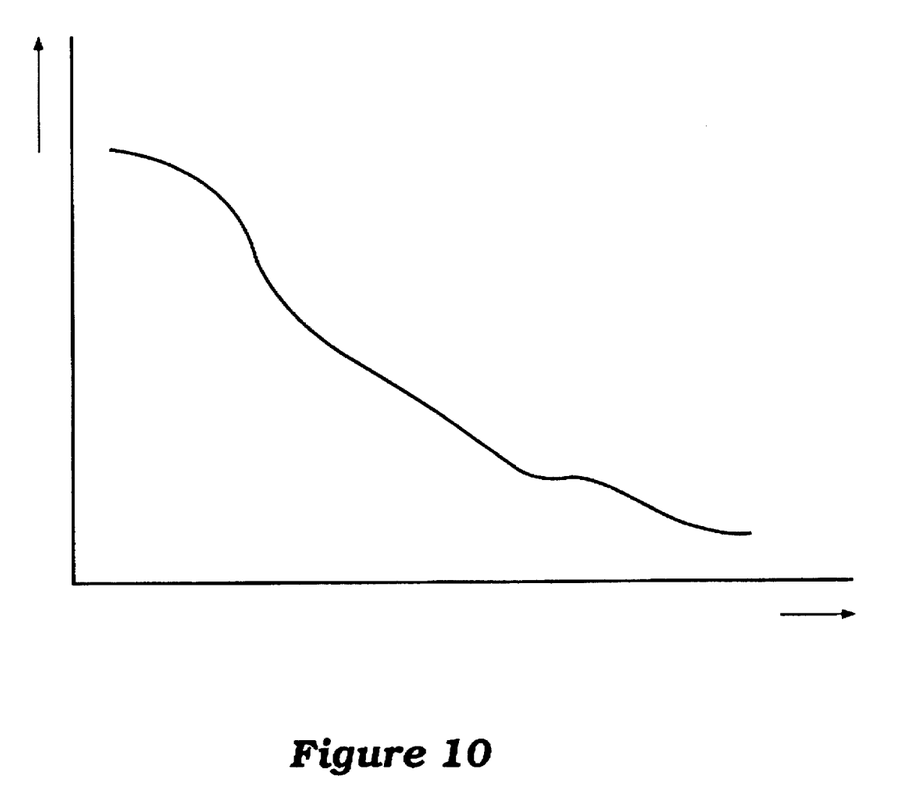
FIG. 10 is a graphical view showing the relation of scavenge flow in relation to load with the embodiment of FIG. 9.

FIG. 10 shows how the amount of added tumble affects the scavenging flow in relation to engine load.

Of course, the foregoing description is that of preferred embodiments of the invention, and various changes and modifications may be made without departing from the spirit and scope of the invention, as defined by the appended claims.

What is claimed is:

1. A two-cycle internal combustion engine having a cylinder block defining a cylinder bore, a piston reciprocating in said cylinder bore, an exhaust port formed in one side of said cylinder bore and opened and closed by the reciprocation of said piston, at least one scavenge passage formed in said cylinder bore and configured so as to create a scavenging air flow that moves axially along said cylinder bore toward said cylinder head, across said cylinder bore, and down said cylinder bore toward said exhaust port, and means for introducing a tumbling air flow into said combustion chamber that flows into said cylinder bore and diametrically across said cylinder bore, axially along said cylinder bore toward said cylinder head, and transversely back across said cylinder bore.

2. A two-cycle engine as set forth in claim 1, wherein the scavenge passage comprises a pair of scavenge passages positioned on opposite sides of the exhaust port.

3. A two-cycle engine as set forth in claim 2, wherein the tumble flow is generated by a tumble port disposed in the area between the scavenge passages.

4. A two-cycle engine as set forth in claim 3, wherein the tumble port is disposed closer to one of the scavenge passages than to the exhaust port.

5. A two-cycle engine as set forth in claim 2, further including a center scavenge passage disposed in the area between the first-mentioned scavenge passages and on diametrically opposite sides of the cylinder bore, the flow through said center scavenge passage being directed axially along the cylinder bore toward the cylinder head and then across the cylinder bore toward the side thereof where the exhaust port is positioned and then axially downwardly toward said exhaust port.

6. A two-cycle engine as set forth in claim 5, wherein the center scavenge passage is positioned diametrically opposite to the exhaust port.

7. A two-cycle engine as set forth in claim 6, wherein the tumble flow is generated by a tumble port disposed in the area between the center scavenge passage and the exhaust port.

8. A two-cycle engine as set forth in claim 7, wherein the tumble port is disposed closer to one of the scavenge passages than to the exhaust port.

9. A two-cycle engine as set forth in claim 8, wherein the tumble passage comprises an extension of one of the side scavenge passages.

10. A two-cycle engine as set forth in claim 8, wherein the tumble passage is formed separately from the remaining passages.

11. A two-cycle engine as set forth in claim 1, further including a charge-forming device for introducing a fuel-air charge into the combustion chamber in proximity to the generated tumble flow.

12. A two-cycle engine as set forth in claim 11, wherein the charge-forming device delivers fuel to the combustion chamber through a tumble port that comprises the means for generating the tumble flow.

13. A two-cycle engine as set forth in claim 1, further including means for controlling the amount of flow through the tumble port.

14. A two-cycle engine as set forth in claim 13, wherein the means for controlling the mount of flow through the tumble port comprises a compressor for delivering compressed air to the tumble port.

15. A two-cycle engine as set forth in claim 13, wherein the means for controlling the air flow through the tumble port comprises a throttle valve in a tumble passage serving the tumble port.

* * * * *